United States Patent [19]

Senso et al.

[11] Patent Number: 4,999,710
[45] Date of Patent: Mar. 12, 1991

[54] TELEVISION SIGNAL RECEIVING APPARATUS

[75] Inventors: Hitoshi Senso; Hisashi Takaki, both of Tokyo, Japan

[73] Assignee: Pioneer Electric Corporation, Tokyo, Japan

[21] Appl. No.: 285,977

[22] Filed: Dec. 19, 1988

[30] Foreign Application Priority Data

Apr. 15, 1988 [JP] Japan .................................. 63-92987
Apr. 15, 1988 [JP] Japan .................................. 63-92988

[51] Int. Cl.$^5$ .......................................... H04N 5/14
[52] U.S. Cl. ................................. 358/160; 358/140; 358/242
[58] Field of Search ............... 358/141, 140, 188, 87, 358/90, 60, 83, 93, 160, 230, 231, 242, 245

[56] References Cited

U.S. PATENT DOCUMENTS 4,613,903 9/1986 Naden .................................. 358/141
4,655,105 1/1987 Faureau .............................. 358/242

FOREIGN PATENT DOCUMENTS 0165882 8/1985 Japan .................................. 358/140

Primary Examiner—Howard W. Britton
Assistant Examiner—David E. Harvey
Attorney, Agent, or Firm—Sughrue, Mion, Zinn Macpeak & Seas

[57] ABSTRACT

A television (TV) signal receiving apparatus displays a TV signal of a high definition system using a TV receiver of an NTSC system with the high picture quality of the high definition system. An A/D converter converts an analog TV signal of a high definition system to a digital signal. A memory stores the digital signal and a vertical filter converts a number of horizontal scanning lines of the TV signal of the high definition system into a number of horizontal scanning lines of a TV signal of an NTSC system. The ratio of horizontal scanning lines of the high definition TV signal to horizontal scanning lines of the NTSC TV signal is 5 to 7. The horizontal scanning lines are divided into three portions in the vertical direction and four portions in the scanning direction and are supplied to twelve CRTs (monitors). The CRTs are arranged in three rows and four columns to form a picture plane.

14 Claims, 8 Drawing Sheets

TELEVISION SIGNAL RECEIVING APPARATUS

BACKGROUND OF THE INVENTION

1. Field of the Invention

The present invention relates to a television (hereinafter abbreviated as "TV") signal receiving apparatus for displaying a picture in a picture area constituted by a plurality of displays, and particularly relates to a TV signal receiving apparatus for converting a TV signal of a high definition system to a TV signal of an NTSC system and displaying a resultant picture on a picture area constituted by a plurality of displays.

2. Description of the Prior Art

At present, the TV broadcast standard in Japan, U.S.A., Canada, etc. is an NTSC system. On the other hand, in order to obtain a picture of higher definition, it has been proposed to change to a high definition broadcasting system.

Since a high definition TV signal is different from an NTSC signal, it cannot be received as it is by a conventional NTSC system TV receiver, and it is therefore necessary to convert the high definition TV signal into an NTSC TV signal. Such a conventional proposal, however, is defective because it is impossible to obtain a picture with definition higher than that of the NTSC system, since the TV signal is received by a TV receiver of the NTSC system. Therefore, it has been impossible to take advantage of the high definition TV signal.

SUMMARY OF THE INVENTION

It is therefore an object of the present invention to eliminate the foregoing defects in the prior art.

It is another object of the present invention to make it possible to display a high definition picture by using an NTSC TV receiver (including a projection TV and so on).

In order to attain the foregoing objects, according to the present invention, the TV signal receiving apparatus comprises: an A/D converter for converting an analog TV signal of a high definition system to a digital signal: a memory for storing the A/D converted TV signal at least one field at a time and a vertical filter for converting the number of horizontal scanning lines of a high definition TV signal into the number of horizontal scanning lines of an NTSC signal at a ratio of five horizontal scanning lines of the former to seven horizontal scanning lines of the latter.

For example, twelve CRTs of the NTSC system are arranged in a matrix of three rows and four columns, that is, four CRTs are horizontally arranged in each row and three CRTs are vertically arranged in each column, to thereby form one picture plane. Seven NTSC horizontal scanning lines are produced from five high definition horizontal scanning lines to thereby increase the number of horizontal scanning lines. The increased horizontal scanning lines are divided into three portions in the vertical direction, and further divided into four portions in the scanning direction, so that the divided portions are respectively supplied to the twelve CRTs.

It is therefore possible to display a high definition picture on NTSC displays with no deterioration of the high definition.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Embodiments of the present invention will be described hereunder with reference to the drawings.

Figure 2:
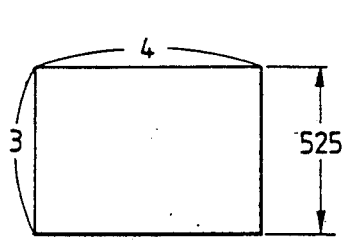
FIG. 2 is a diagram for explaining the NTSC system.

FIG. 2 shows a typical TV picture plane of the NTSC system. The aspect ratio of the picture plane is set to 4:3 in this system, and the number of horizontal scanning lines of one frame is selected to be 525. The number of horizontal scanning lines in the effective picture plane, i.e., those which are actually displayed, is approximately 483. If the number of samples taken of one horizontal scanning line in processing a picture in a digital manner is selected to be 360, the number of samples over the selected effective picture plane is, for example, 297.

Figure 3:
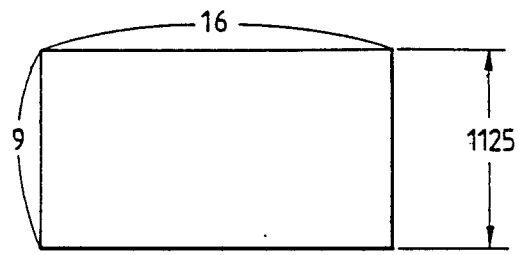
FIG. 3 is a diagram for explaining the high definition system.

FIG. 3 shows a typical TV picture plane of the high definition system. The aspect ratio of the picture plane is set to 16.9 in this system, and the number of horizontal scanning lines of one frame is selected to be 1,125. The number of horizontal scanning lines in the effective picture plane which appear on the real picture plane is, for example, 1,035. If the number of samples taken of one horizontal scanning line is selected to be 1,440, the number of samples over the effective picture plane is 1,188.

Figure 4:
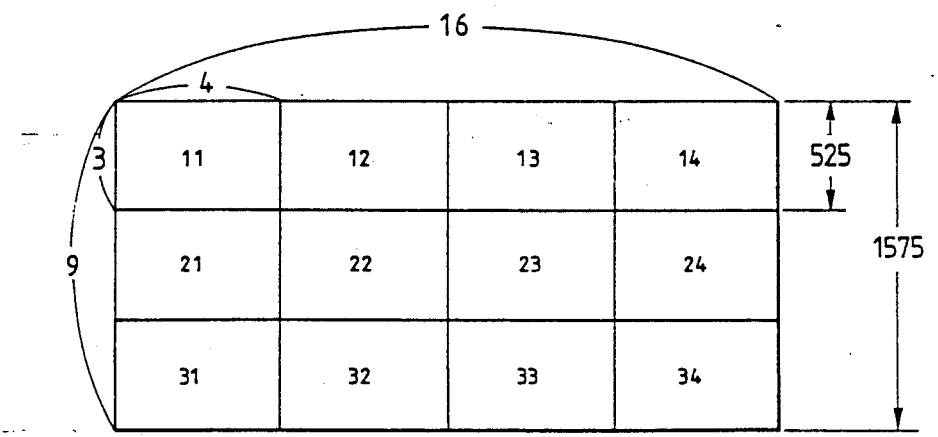
FIG. 4 is a diagram for explaining the CRTs according to the present invention.

FIG. 4 shows an arrangement of a picture plane according to the present invention. According to the present invention. CRTs (which may be liquid crystal displays or the like) 11 to 34 are NTSC displays arranged in a matrix of three rows and four columns so that the twelve CRTs are arranged to constitute the picture plane. Since each CRT is established as having its aspect ratio of 4:3 in accordance with the NTSC system, the aspect ratio of the picture plane constituted by the twelve CRTs is 16:9. Thus, it is possible to make the aspect ratio of the picture plane correspond to that of the high definition system.

Of the 1,575 horizontal scanning lines which have been produced in this manner, the first 525 horizontal scanning lines are fed to CRTs 11 to 14 in the first row or upper stage, the next 525 horizontal scanning lines are fed to CRTs 21 to 24 in the second row or middle stage, and the last 525 horizontal scanning lines are fed to CRTs 31 to 34 in the third row or lower stage, so that each CRT is scanned by 525 horizontal scanning lines in the same manner as in the ordinary NTSC system.

Since four CRTs are arrayed in the horizontal direction in each row, horizontal scanning lines are divided in the horizontal direction into four separate scanning lines. Thus, signals each having a quarter of the length of an original signal are fed to the respective CRTs n1 to n4 (n being 1, 2 and 3) sequentially.

Consequently, it is possible to display one picture using twelve CRTs.

Figure 1:
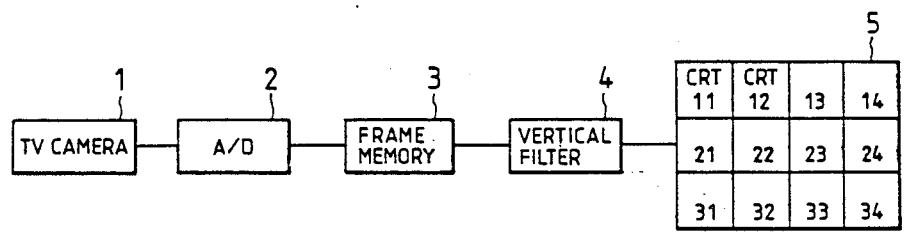
FIG. 1 is a block diagram of a TV signal receiving apparatus which is a first embodiment of the present invention.

FIG. 1 is a block diagram of a first embodiment of the TV signal receiving apparatus according to the present invention. In FIG. 1, the apparatus is provided with a high definition TV camera 1 for producing a high definition TV signal. Of course, the TV camera 1 may be replaced by a TV tuner, a VTR, or the like, of the high definition system.

An A/D converter 2 converts an input analog TV signal to a digital form. A frame memory 3 then stores the converted TV signal one frame at a time. A vertical filter 4 converts the number of horizontal scanning lines of the high definition system to the number of horizontal scanning lines of the NTSC system. CRTs of the NTSC system 5 are arranged in a manner as described above to display a resultant picture.

Figure 5:
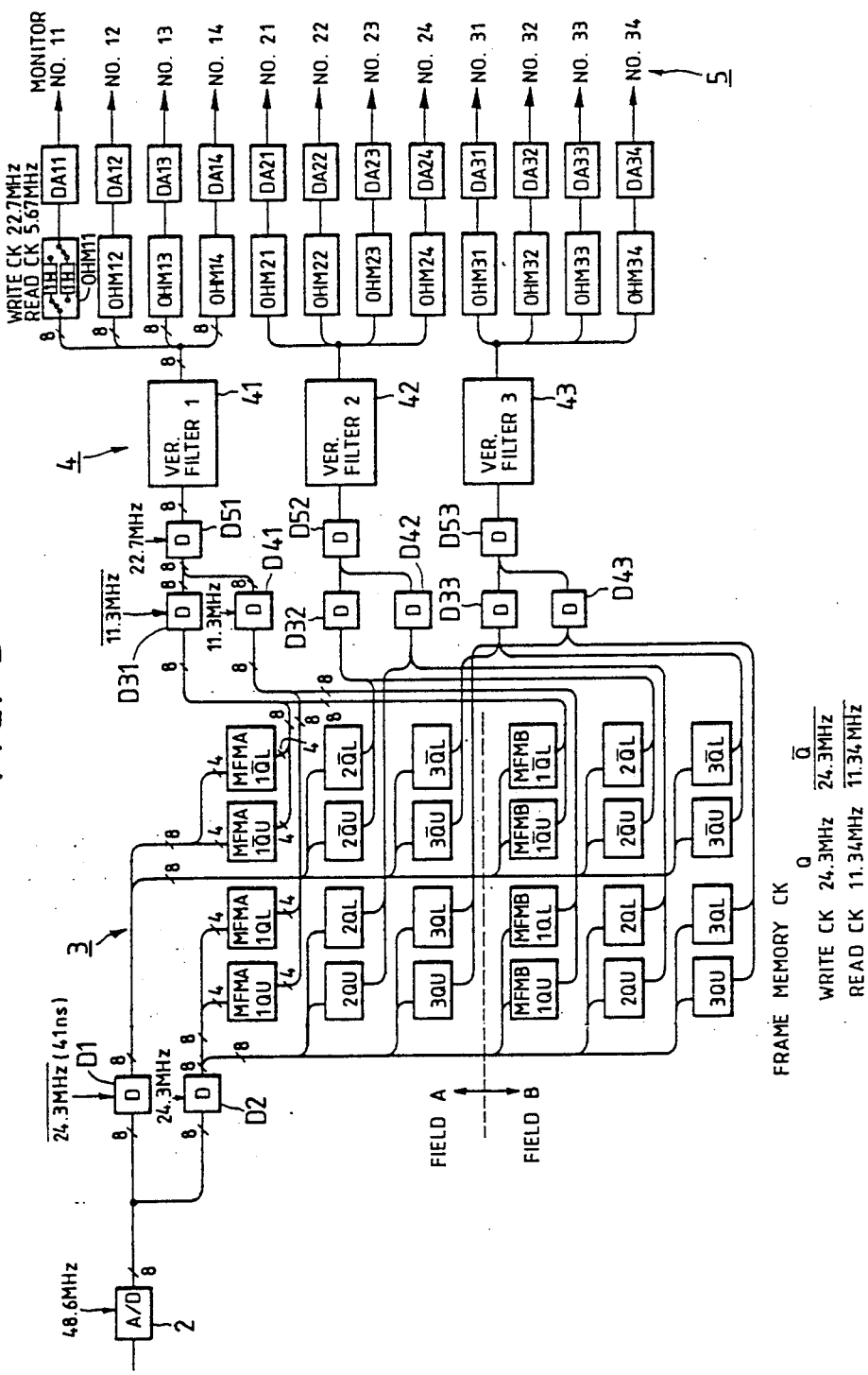
FIG. 5 is a block diagram showing the apparatus of FIG. 1 in more detail.

FIG. 5 is a block diagram showing the apparatus of FIG. 1 in more detail. A/D converter 2 converts an input analog high definition TV signal to an eight bit digital signal, for example, by use of a 48.6 MHz clock. The output of A/D converter 2 is input to and latched by latch circuits D1 and D2. Latch circuits D1 and D2 are operated respectively at the negative and positive edges of a 24.3 MHz clock.

The data first output by latch circuit D1 correspond to the horizontal scanning lines of the first ⅓ of one field, and the four most significant bits of this data are stored in memory MFMA1$\overline{Q}$U. The four least significant bits of the same data are stored in memory MFMA1$\overline{Q}$L. Of course, it is possible to store the data in the same memory instead of storing it in two separate memories.

In the same manner, the data corresponding to the horizontal scanning lines of the next ⅓ of the field are stored in memories MFMA2$\overline{Q}$U and MFMA2$\overline{Q}$L and the data corresponding to the horizontal scanning lines of the last ⅓ of the field are stored in memories MFMA3$\overline{Q}$U and MFMA3$\overline{Q}$L. The negative edge of a 24.3 MHz clock is used as a write clock for those memories.

The data output from latch circuit D2 which corresponds to the same field is stored in the same manner in memories MFMA1QU, MFMA1QL, MFMA2QU, MFMA2QL, MFMA3QU and MFMA3QL. The positive edge of a 24.3 MHz clock is used as a write clock for those memories.

The data corresponding to one field (i.e., Field A) is stored in this manner by those memories.

Since one new horizontal scanning line (1H) is produced through operational processing of seven continuous horizontal scanning lines (7H) as will be described later, the data corresponding to the last three scanning lines (3H) written in the upper stage memories MFMA1$\overline{Q}$U, MFMA1$\overline{Q}$L, MFMA1QU and MFMA1QL is also written into the middle stage memories MFMA2$\overline{Q}$U, MFMA2$\overline{Q}$L, MFMA2QU and MFMA2QL at the same time. The same occurs between the memories in the lower and upper stages.

In the same manner, the data corresponding to the next field (Field B) is written respectively into memories MFMB1$\overline{Q}$U, MFMB1$\overline{Q}$L, MFMB2$\overline{Q}$U, MFMB2$\overline{Q}$L, MFMB3$\overline{Q}$U, MFMB3$\overline{Q}$L, MFMB1QU, MFMB1QL, MFMB2QU, MFMB2QL, MFMB3QU and MFMB3QL.

The data corresponding to one frame is stored in this manner in the frame memory 3 constituted by the memories MFMA1$\overline{Q}$U to MFMB3QL.

The data written in the upper stage memories MFMA1$\overline{Q}$U, MFMA1$\overline{Q}$L, MFMA1QU and MFMA1QL for one field is read out at the negative and positive edges of a 11.3 MHz clock, and latched by latch circuits D31 and D41. The data latched by the latch circuits D31 and D41 is input to a latch circuit D51 operated by a 22.7 MHz clock, and combined in latch circuit D51. The data output from latch circuit D51 is input to a Vertical filter 41. In the same manner, the data stored in the upper stage memories MFMB1$\overline{Q}$U, MFMB1$\overline{Q}$L, MFMB1QU and MFMB1QL for the other field are input to the vertical filter 41.

In the same manner, the data in the middle stage memories MFMA2$\overline{Q}$U, MFMA2$\overline{Q}$L, MFMA2QU, MFMA2QL, MFMB2$\overline{Q}$U, MFMB2$\overline{Q}$L, MFMB2QU and MFMB2QL for the two fields are input to a vertical filter 42 through latch circuits D32, D42 and D52, and the data in the lower stage memories MFMA3$\overline{Q}$U, MFMA3$\overline{Q}$L, MFMA3QU, MFMA3QL, MFMB3$\overline{Q}$U, MFMB3$\overline{Q}$L, MFMB3QU and MFMB3QL are input to a vertical filter 43 through latch circuits D33, D43 and D53.

Figure 6:
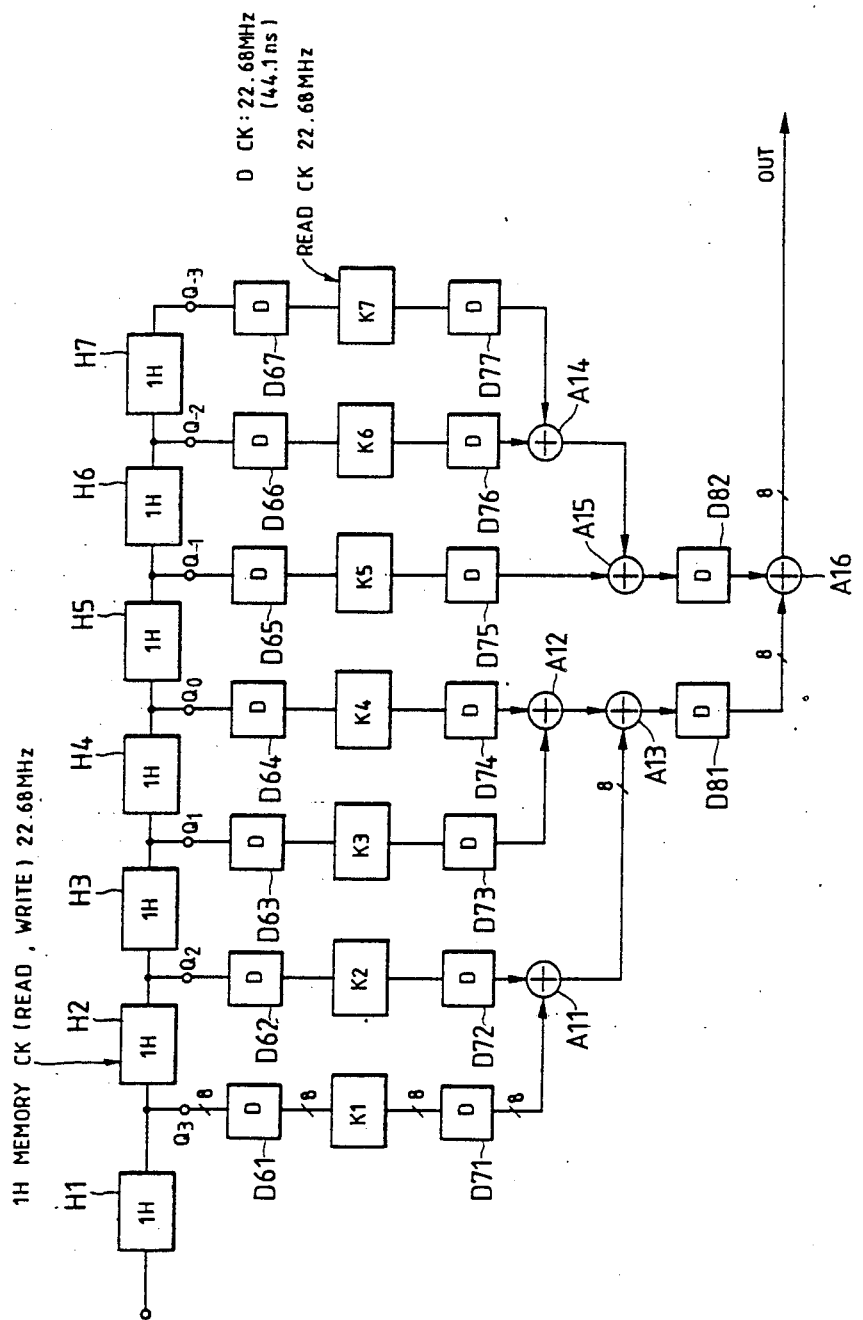
FIG. 6 is a block diagram of the vertical filter of FIG. 5.

FIG. 6 shows the arrangement of vertical filter 41 (the same arrangement applies to vertical filters 42 and 43). Vertical filter 41 is constituted by 1H memories H1 to H7 which are delay means for delaying an input signal by 1H, coefficient circuits K1 to K7 such as PROMS (Programmable Read-Only Memories) or the like for multiplying input data by a predetermined coefficient, adders A11 to A16 and latch circuits D61 to D67, D71 to D77, D81 and D82.

Those circuits are driven by a 22.68 MHz clock. The coefficient circuits K1 to K7 change their coefficients by a cycle period of 7H (i.e., the same coefficient is used for a given coefficient circuit every 7H).

Assuming that a signal output from a 1H memory in a 1H period in a vertical filter is $Q_n$, a signal output from the same memory in the next 1H period when the data has been transferred is $Q_{n+1}$ and the output of the vertical filter is $P_i$, the following equations are established.

$$P_0 = h_{-21}Q_{-3} + h_{-14}Q_{-2} + h_{-7}Q_{-1} + h_0Q_0 + h_7Q_1 + h_{14}Q_2 + h_{21}Q_3$$

$$P_1 = h_{-19}Q_{-2} + h_{-12}Q_{-1} + h_{-5}Q_0 + h_2Q_1 + h_9Q_2 + h_{16}Q_3 + h_{23}Q_4$$

$$P_2 = h_{-24}Q_{-2} + h_{-17}Q_{-1} + h_{-10}Q_0 + h_{-3}Q_1 + h_4Q_2 + h_{11}Q_3 + h_{18}Q_4$$

$$P_3 = h_{-22}Q_{-1} + h_{-15}Q_0 + h_{-8}Q_1 + h_{-1}Q_2 + h_6Q_3 + h_{13}Q_4 + h_{20}Q_5$$

-continued $$P_4 = h_{-20}Q_0 + h_{-13}Q_1 + h_{-6}Q_2 + h_1Q_3 + h_8Q_4 + h_{15}Q_5 + h_{22}Q_6$$

$$P_5 = h_{-18}Q_1 + h_{-11}Q_2 + h_{-4}Q_3 + h_3Q_4 + h_{10}Q_5 + h_{17}Q_6 + h_{24}Q_7$$

$$P_6 = h_{-23}Q_1 + h_{-16}Q_2 + h_{-9}Q_3 + h_{-2}Q_4 + h_5Q_5 + h_{12}Q_6 + h_{19}Q_7$$

$$P_7 = (P_0) = h_{-21}Q_2 + h_{-14}Q_3 + h_{-7}Q_4 + h_0Q_5 + h_7Q_6 + h_{14}Q_7 + h_{21}Q_8$$

. . . . . . .
. . . . . . .
. . . . . . .

where, $h_n$ represents an impulse response of the filter, and $h_n = h_{-n}$.

The thus obtained seven successive horizontal scanning lines multiplied by the predetermined corresponding coefficients are added to each other, so that one new horizontal scanning line is produced.

Figure 7:
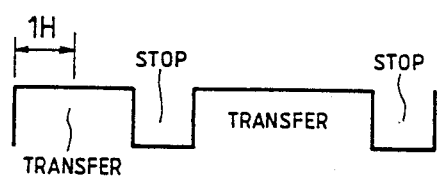
FIG. 7 is a timing diagram of the device of FIG. 6.

This process is executed according to the timing shown in FIG. 7 with each memory transferring data sequentially in the first 2H period, followed by transfer of data in the next 1H period, followed by data transfer in the next 3H period, and finally stopping transfer of data in the next 1H period. In this duration, the coefficients of the respective coefficient circuits are changed every 1H period, and the output is operated and produced every 1H period. Consequently, new horizontal scanning lines are produced at such a ratio that seven new horizontal scanning lines are produced from five original horizontal scanning lines.

Returning to FIG. 5, of the data corresponding to a 1H period output from the vertical filter 41, the first ¼ is written into a 1H memory OHM11, the second ¼ is written into a memory OHM1C, the third ¼ is written into a memory OHM13, and the last ¼ is written into a memory OHM14, A 22.7 MHz clock is used to write the data. The data written in the respective memories is read out by a 5.67 MHz clock. D/A converted by respective D/A converters DA11 to DA14, and output to the CRTs (monitors) 11 to 14 arrayed in the horizontal direction.

The respective memories OHM11 to OHM14 include two 1H memories and two switches as shown in OHM11, so that one of the 1H memories may be read from while the other is being written into.

In the same manner, the data output from the vertical filter 42 is fed into the middle stage CRTs 21 to 24 through memories OHM21 to OHM24 and D/A converters DA21 to DA24. The data output from the vertical filter 43 is fed into the lower stage CRTs 31 to 34 through memories OHM31 to OHM34 and D/A converters DA31 to DA34. Consequently, a single picture is displayed by a combination of the twelve CRTs.

Although the above-mentioned embodiment has illustrated the case where horizontal scanning lines constituting one picture plane (one field) are divided into three parts in the vertical direction and stored in three stages of memories, it is possible to divide them into four parts in the horizontal direction and make four stages of memories memorize those divisional parts. In the latter case, however, the capacity of a frame memory becomes large.

Figure 8:
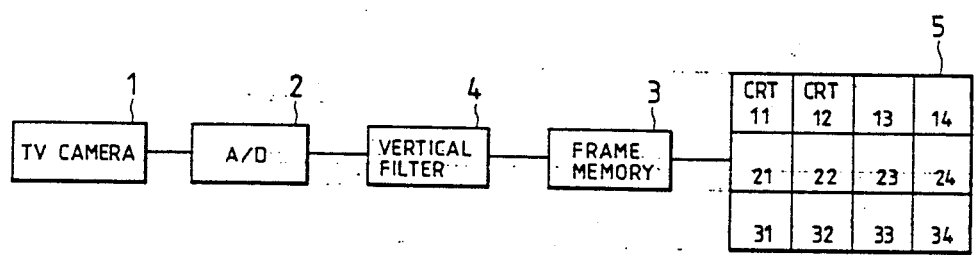
FIG. 8 is a block diagram of a second embodiment of the present invention.

FIG. 8 is a block diagram showing a second embodiment of the present invention. In this embodiment, as opposed to FIG. 1, a frame memory 3 is disposed between vertical filter 4 and CRTs 11 to 34. The arrangement of the other elements of FIG. 4 is the same as that in FIG. 1.

Figure 9:
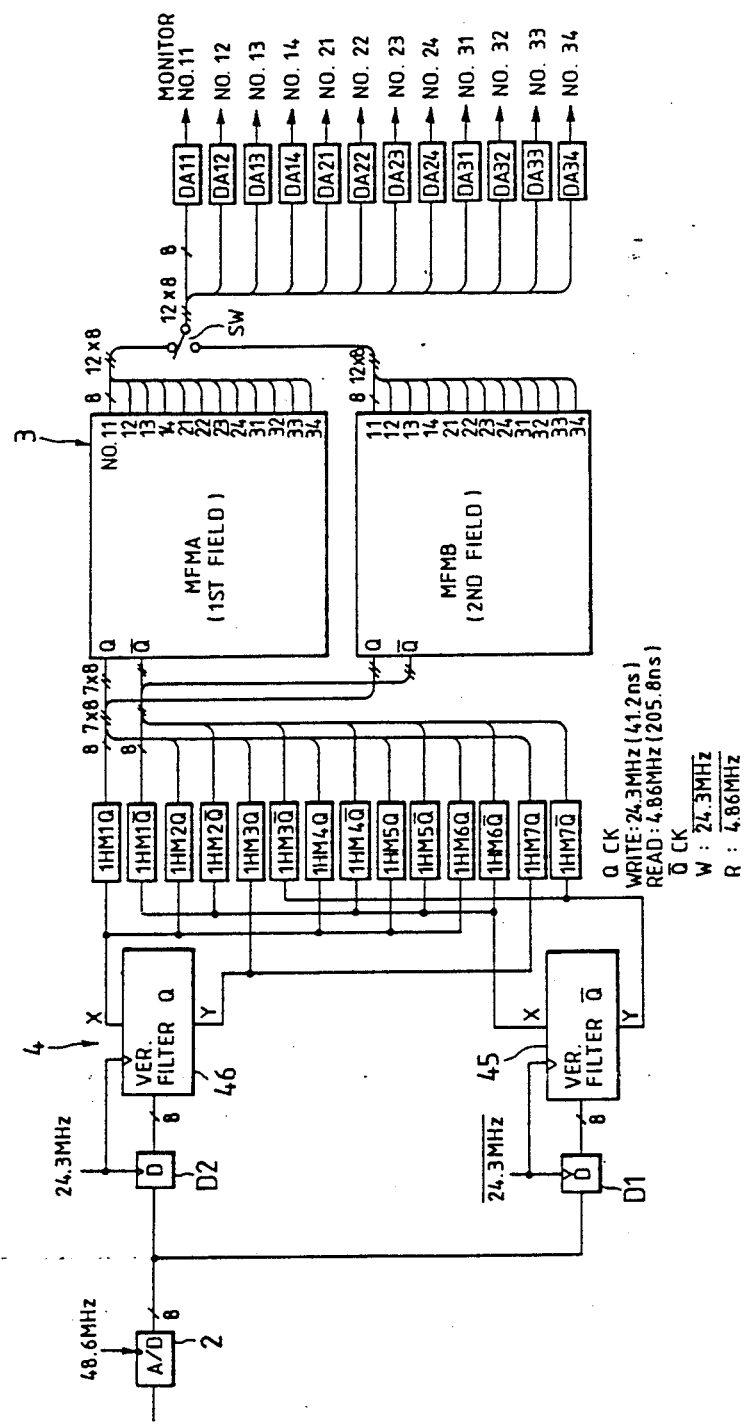
FIG. 9 is a block diagram showing the apparatus of FIG. 8 in more detail.

FIG. 9 is a block diagram showing the apparatus of FIG. 8 in greater detail. The output of an A/D converter 2 is input to vertical filters 45 and 46 through latch circuits D1 and D2, respectively.

Figure 10:
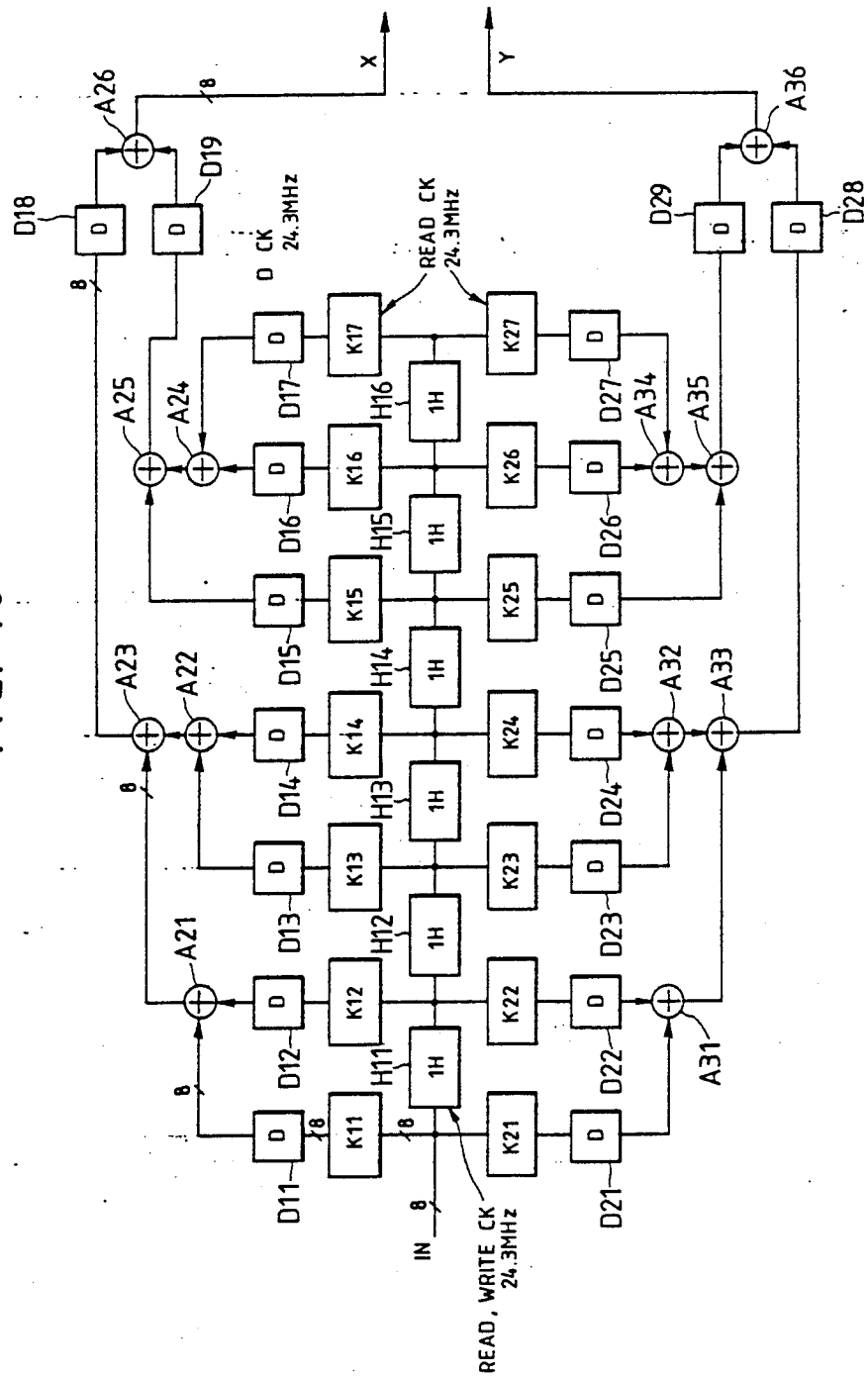
FIG. 10 is a block diagram of the vertical filter of FIG. 9.

As shown in FIG. 10, the vertical filter 45 (46) is constituted by 1H memories H11 to H16, coefficient circuits K11 to K17 and K21 to K27, adders A21 to A26 and A31 to A36 and latch circuits D11 to D19 and D21 to D29. Although the basic arrangement is the same as in FIG. 6, since it is possible that two data signals are output at the same time, first and second circuits respectively illustrated above and below 1H memories H11 to H16 are provided in this embodiment. Five eight bit data signals are output from the first circuit (an output terminal X), and two eight bit data signals are output from the second circuit (an output terminal Y).

Figure 13:
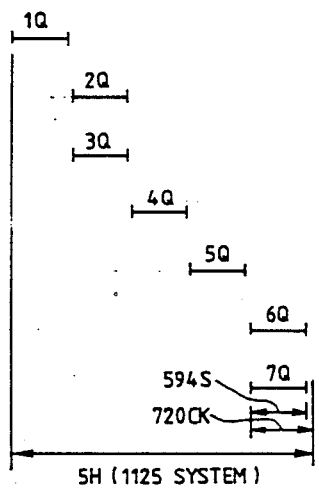
FIG. 13 is a timing diagram of the device of FIG. 9.

The output from output terminal X of vertical filter 45 is read out at the negative edge of a 24.5 MHz clock, and written into 1H memories 1HM1$\overline{Q}$, 1HM2$\overline{Q}$, 1HM4$\overline{Q}$, 1HM5$\overline{Q}$ and 1HM6$\overline{Q}$, and the output from output terminal Y is written into 1H memories 1HM3$\overline{Q}$ and 1HM7$\overline{Q}$. The write timing is shown in FIG. 13. That is, after data is written into memory 1HM1$\overline{Q}$ from output terminal X, data is read out from output terminals X and Y simultaneously in the next 1H period and written into memories 1HM2$\overline{Q}$ and 1HM3$\overline{Q}$, respectively. In the next 2H period, the data read from output terminal X is written into memories 1HM4$\overline{Q}$ and 1HM5$\overline{Q}$ sequentially. Further, in the next 1H period, the data read from output terminals X and Y simultaneously is written into memories 1HM6$\overline{Q}$ and 1HM7$\overline{Q}$.

Seven horizontal scanning lines are thus produced from five horizontal scanning lines.

In the same manner, data read out from vertical filter 46 is written into 1H memories 1HM1Q to 1HM7Q every 1H period.

The data written in the respective 1H memories 1HM1$\overline{Q}$ to 1HM7$\overline{Q}$ and 1HM1Q to 1HM7Q are read out at the negative and positive edges of a 4.86 MHz clock, and stored by the memories MFMA and MFMB, respectively. The data of the first field is written into memory MFMA and the data of the second field is written into memory MFMB.

Figure 11:
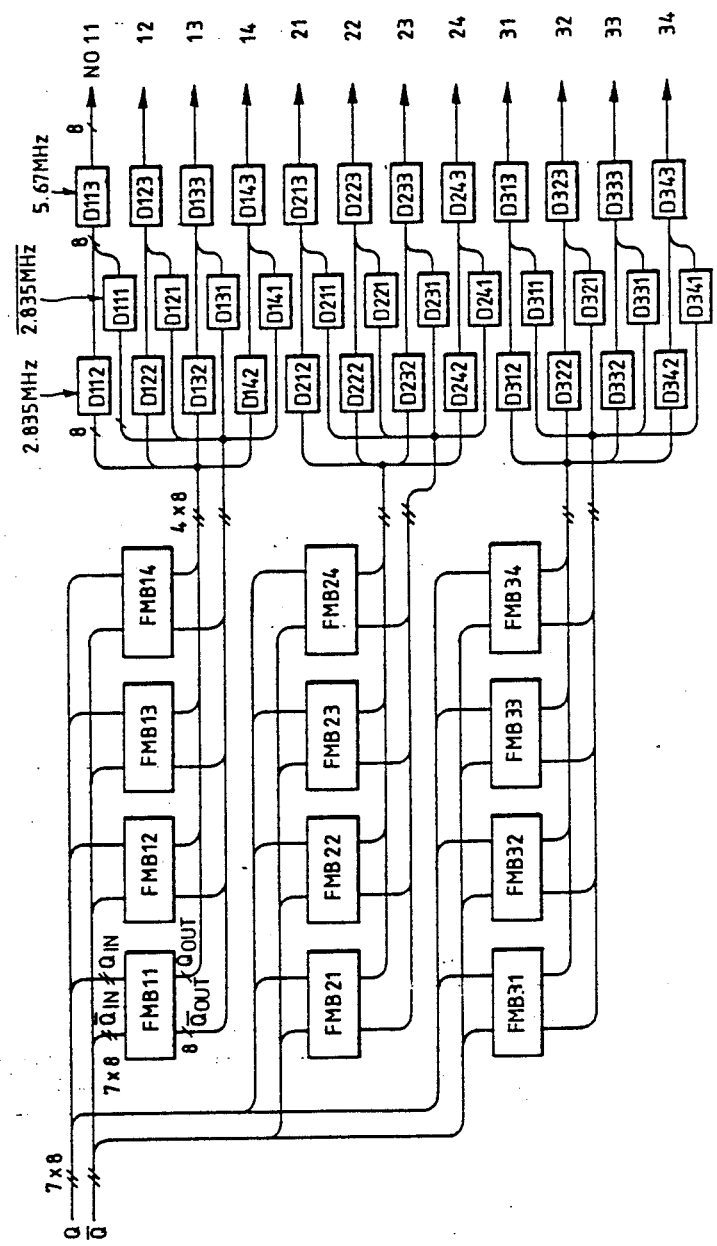
FIG. 11 is a block diagram of the frame memory of FIG. 9.

As shown in FIG. 11, the memory MFMA (MFMB) is constituted by three stages of memories FMB11 to FMB34. The data corresponding to the horizontal scanning lines of the first ⅓ of one field is written into upper stage memories FMB11 to FMB14, the data corresponding to the horizontal scanning lines of the next ⅓ of the field is written into middle stage memories FMB21 to FMB24, and the data corresponding to the horizontal scanning lines of the final ⅓ of the field is written into lower stage memories FMB31 to FMB34. Moreover, 1H data is divided into four portions, so that the first ¼ portion of the data is written into memories FMBn1, the next ¼ portion of the data is written into memories FMBn2, the next ¼ portion of the data is written into memories FMBn3, and the last ¼ portion of the data is written into memories FMBn4 (where n is 1, 2 or 3).

Figure 12:
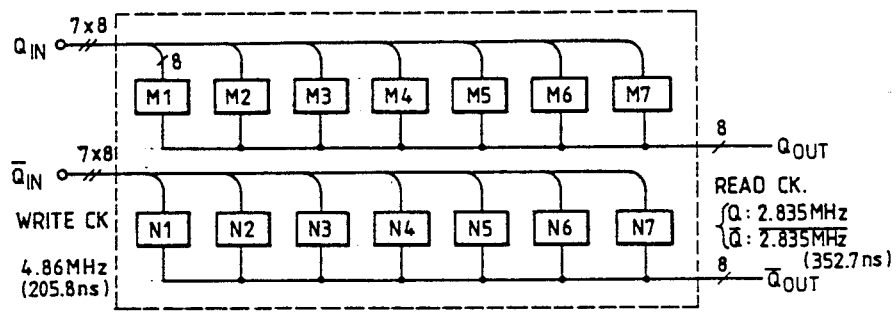
FIG. 12 is a block diagram of the memory of FIG. 11.

FIG. 12 is a block diagram showing the memory FMB11 in more detail (this description also applies to memories FMB12 to FMB34). Memory FMB11 is constituted by seven memories M1 to M7 for storing data applied to an input terminal Q and seven memories N1 to N7 for storing data applied to an input terminal $\overline{Q}$. The negative and positive edges of a 4.86 MHz clock are used as a write clock, and the negative and positive edges of a 2.835 MHz clock are used as a read clock.

The data stored in memory FMB11 is read out at the negative and positive edges of the 2.835 MHz clock, and latched by latch circuits D111 and D112. The data latched by latch circuits D111 and D112 are combined and latched by a latch circuit D113 operated by a 5.67 MHz clock.

In the same manner, the data stored by the memories FMB12 to FMB34 are output through latch circuits D121 to D343.

The memories MFMA and MFMB operate so that data is read out from one of the memories while data is written into the other. The data read out from memories MFMA and MFMB is input to D/A converters DA11 to DA34 through a switch SW which is switched after every field of data has been read so that the data is D/A converted and then fed to the respective CRTs (monitors) 11 to 34.

According to the present invention, twelve CRTs are arranged in a matrix of three rows and four columns. Four CRTs are arranged in the horizontal direction in each row and three CRTs are arranged in the vertical direction in each column, to thereby constitute a picture plane, and the horizontal scanning lines of the high definition system are increased in number by 7/5 times and the increased number of horizontal scanning lines are divided into portions corresponding to the CRTs so that the divisional portions are respectively supplied to the corresponding CRTs, whereby it is possible to display a picture of high definition by using CRTs of the NTSC system.

What is claimed is:

1. A television signal receiving apparatus comprising:
   an A/D converter for converting an analog TV signal of a high definition system to a digital signal;
   a memory for storing said digital signal at least one field at a time;
   a vertical filter for converting a number of high definition TV signal horizontal scanning lines represented by at least a portion of said stored digital signal into a number of horizontal scanning lines of a TV signal of an NTSC system; and
   a plurality of NTSC displays arranged in n rows, each of said plurality of NTSC displays driven by an NTSC signal having X lines per frame which include at least a portion of said converted horizontal scanning lines of said NTSC system TV signal;
   wherein said vertical filter converts said high definition TV signal to a number of lines equal to Xn; and
   wherein said vertical filter comprises:
   means for generating one new horizontal scanning line by multiplying 7 successive horizontal scanning lines by corresponding coefficients and then adding the resultant lines;
   means for changing the coefficients every horizontal period; and
   means for generating new horizontal scanning lines at the rate of 7 new lines of an NTSC TV signal per 5 lines of high definition TV signal.

2. A television signal receiving apparatus as claimed in claim 1, wherein X=525.

3. A television signal receiving apparatus as claimed in claim 1, wherein the number of said plurality of displays is twelve and wherein the displays are arranged in a matrix of three rows and four columns.

4. A television signal receiving apparatus as claimed in claim 1, wherein said memory comprises a predetermined number of stages and horizontal scanning lines of one field are divided into as many portions as the number of stages in the vertical direction so that said portions are respectively stored in said stages of said memory.

5. A television signal receiving apparatus as claimed in claim 4, wherein said predetermined number is three.

6. A television signal receiving apparatus as claimed in claim 1, wherein n=3.

7. A television signal receiving apparatus as claimed in claim 1, wherein the number of horizontal scanning lines for one frame of said high definition TV signal is 1,125.

8. A television signal receiving apparatus comprising:
   an A/D converter for converting an analog TV signal of a high definition system to a digital signal;
   a vertical filter for converting a number of high definition TV signal horizontal scanning lines represented by at least a portion of said digital signal provided from said A/D converter into a number of horizontal scanning lines of a TV signal of an NTSC system;
   a memory for storing said converted horizontal scanning lines of said NTSC system TV signal at least one field at a time; and
   a plurality of NTSC displays arranged in n rows, each of said plurality of NTSC displays driven by an NTSC signal having X lines per frame which include at least a portion of said converted horizontal scanning lines of said NTSC system TV signal;
   wherein said vertical filter converts said high definition TV signal to a number of lines equal to Xn; and
   wherein said vertical filter comprises:
   means for generating one new horizontal scanning line by multiplying 7 successive horizontal scanning lines by corresponding coefficients and the adding the resultant lines;
   means for changing the coefficients every horizontal period; and
   means for generating new horizontal scanning lines at the rate of 7 new lines of an NTSC TV signal per 5 lines of high definition TV signal.

9. A television signal receiving apparatus as claimed in claim 8, wherein X=525.

10. A television signal receiving apparatus as claimed in claim 8, wherein the number of said plurality of displays is twelve and wherein the displays are arranged in a matrix of three rows and four columns.

11. A television signal receiving apparatus as claimed in claim 8, wherein said memory comprises a predetermined number of stages, and horizontal scanning lines of one field are divided into as many portions as the number of stages in the vertical direction so that said portions are respectively stored in said stages of said memory.

12. A television signal receiving apparatus as claimed in claim 11, wherein said predetermined number is three.

13. A television signal receiving apparatus as claimed in claim 8, wherein n=3.

14. A television signal receiving apparatus as claimed in claim 8, wherein the number of horizontal scanning lines for one frame of said high definition TV signal is 1,125.

* * * * *